United States Patent [19]

Feres

[11] Patent Number: 4,707,220

[45] Date of Patent: Nov. 17, 1987

[54] THIN-FILM EVAPORATORS

[76] Inventor: Vaclav Feres, Haid-und Neu-Str. 14, D-7500 Karlsruhe 1, Fed. Rep. of Germany

[21] Appl. No.: 840,531

[22] Filed: Mar. 14, 1986

Related U.S. Application Data

[63] Continuation of Ser. No. 688,411, Jan. 2, 1985, abandoned.

[30] Foreign Application Priority Data

Jan. 14, 1984 [DE] Fed. Rep. of Germany ....... 3401121

[51] Int. Cl.$^4$ .............................................. B01D 1/22
[52] U.S. Cl. .................................... 159/6.1; 159/13.3; 159/43.1; 159/49; 159/DIG. 8; 202/235; 202/236; 203/4; 203/89; 165/88
[58] Field of Search ................. 159/6.1, 49, 13.1, 13.3, 159/13.2, DIG. 8, 43.1; 202/236, 235; 203/89, 4; 165/88, 115

[56] References Cited

U.S. PATENT DOCUMENTS

| | | | |
|---|---|---|---|
| 2,894,879 | 7/1959 | Hickman | 203/27 |
| 3,221,807 | 12/1965 | Johansson | 159/6.1 |
| 3,233,879 | 2/1966 | Mitchell | 159/6.1 |
| 3,430,690 | 3/1969 | Sciaux | 159/6.1 |
| 3,572,415 | 3/1971 | Voncken | 202/236 |
| 3,640,330 | 2/1972 | Javet | 159/6.1 |
| 3,764,483 | 10/1973 | Tleimat | 202/236 |
| 3,878,029 | 4/1975 | Baird et al. | 159/14 |
| 3,891,495 | 6/1975 | Baird | 159/49 |
| 3,921,709 | 11/1975 | Feres | 165/88 |
| 4,167,454 | 9/1979 | Feres | 202/236 |
| 4,193,837 | 3/1980 | Wyss et al. | 202/236 |
| 4,451,334 | 5/1984 | Ciocca et al. | 159/6.1 |

FOREIGN PATENT DOCUMENTS

| | | | |
|---|---|---|---|
| 2603480 | 8/1977 | Fed. Rep. of Germany | 159/6.1 |
| 1132640 | 11/1968 | United Kingdom | 203/89 |

Primary Examiner—S. Leon Bashore
Assistant Examiner—V. Manoharan

[57] ABSTRACT

A thin film evaporator consists of an enclosure defining a vapor space, a level drive shaft running into the enclosure and a rotor fixed to the shaft and having an axis of rotation disposed horizontally when in operative position, the rotor being made up of spaced coaxial conical evaporator elements, whose evaporation space communicates with the vapor space. The feed to be evaporated is supplied at one end of the rotor at the inner circumference of one or more conical evaporator elements thereof. Such evaporator elements are placed together in pairs so that they taper outwards with the evaporating faces thereof facing each other, so as to form a collection trough at their outer edges for the concentrate. The feed spreads out in the form of a film from the inner edge or edges for the elements and is taken up in the respective collection trough as a preconcentrate. Such preconcentrate is then taken up by a respective scoop tube at the top of the collection trough and flows down under gravity to one or more adjacently placed evaporator elements of a second evaporator stage and is finally removed as the final concentrate at the other end of the rotor.

11 Claims, 1 Drawing Figure

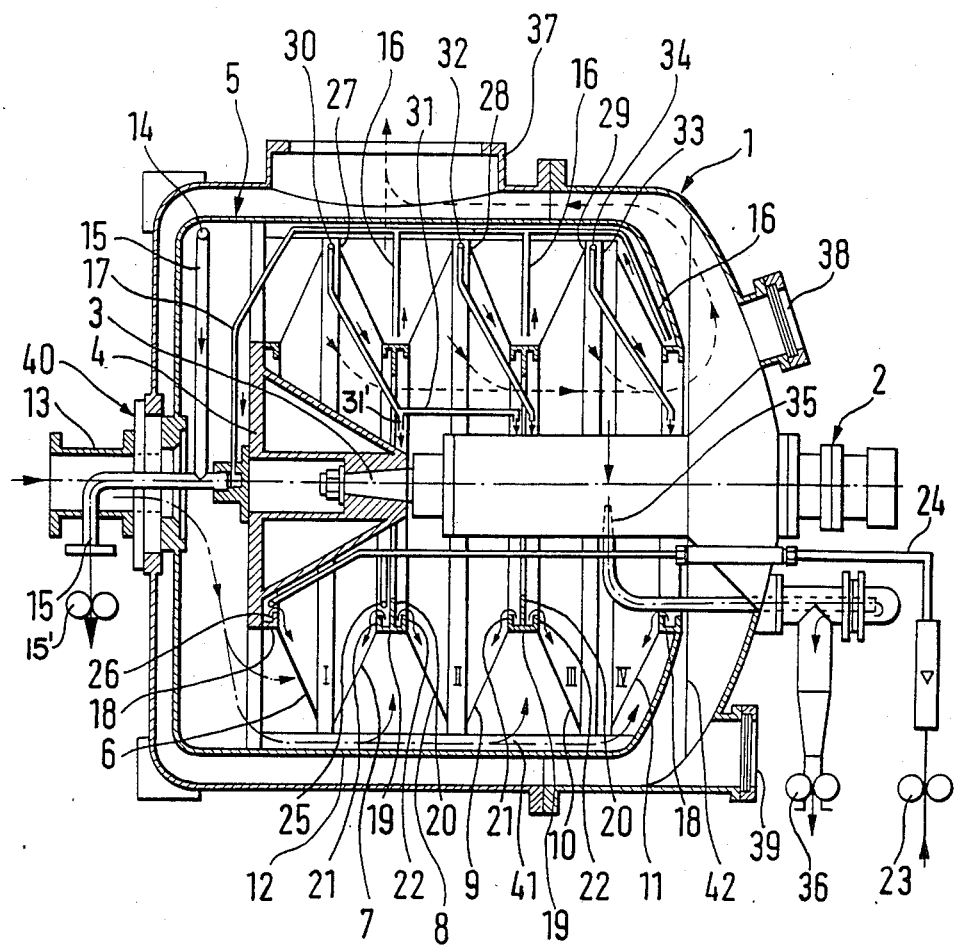

THIN-FILM EVAPORATORS

This is a continuation of co-pending application Ser. No. 688,411 filed on Jan. 1, 1985, now abandoned.

BACKGROUND OF THE INVENTION

The invention relates to thin-film evaporators of the sort made up of an enclosure delimiting a vapor space, of a central driving shaft projecting into the enclosure, and of a rotor, attached to the driving shaft, made up of axially spaced evaporator surface elements coaxial to said shaft and defining on the one hand an evaporation space that is in communication with the vapor space, and on the other hand a heating space separated from the vapor space. When the evaporator is in use the feed or fluid to be evaporated is supplied at a first end of the rotor and at the inner edge of one or more conical evaporator elements of a first evaporating stage so that it thence spreads outwards as a film and reaches the outer edge as a preconcentrate, that is taken up by way of a scoop tube and passes from the tube to one or more consecutively adjacent evaporating surface elements of at least one second evaporator stage and is run off as final concentrate at the second end of the rotor.

Thin-film evaporators of this art as proposed in the prior art (see the British Pat. No. 1,132,640 and the Swedish Pat. No. 184,175) may be so designed that each two evaporator elements are placed with a small distance between them and have a conical form tapering in the same direction to form a heating space therebetween. To the inside they are terminated by a ring that is welded in place, while to the outside they are fixed to a ring having holes through it so as to form a communication between the space between the evaporator elements and the cylindrical heating space of the rotor. Steam is introduced into the heating space via the hollow driving shaft and a space underneath the lowest evaporator element, such steam then making its way through the holes into the space between the closely spaced evaporator element and running back as a condensate into the heating space under the effect of centrifugal force. The feed is sprayed between each two pairs of evaporator elements via a tube with a number of discharge points and it is directed against the evaporating faces of the evaporator element. The feed spreads in the form of a film in an outward direction and is collected at the outer edge in a gutter or trough formed between the evaporating faces. The troughs are joined up in axial alinement by way of a duct, through which the concentrated feed runs past a number of axially alined evaporating elements to a single discharge trough for this first stage of the evaporator. A scoop tube is mounted for use with this discharge trough so as to scoop up the preconcentrate. The scoop tube is connected via a pump placed outside the evaporator so as to draw up the preconcentrate and pass it via a duct back to the evaporator. The preconcentrate is then sprayed onto the evaporator faces of the last evaporator stage, it spreading out again in the form of a film and endings up at the outer edge as the final concentrate in the vicinity of a further scoop tube, via which it is taken up by a further pump. The vapors produced during the process of evaporation may be taken through the space in the rotor, collected in the enclosure and removed through a central connection.

Thin film evaporators of this sort are more specially suitable for highly concentrating very weak concentrate or feeds. However, they do have the drawback that for heating the material it is necessary to have twinned evaporator elements with the necessary amount of space between them and generally speaking only the lower evaporating face of each second evaporator element for the evaporation of the feed. Furthermore, the structure of the rotor as a whole is comparatively involved. The outer rings, on which the evaporator element are mounted, have to be supported, centered and sealed off from each other. For the transfer of the preconcentrate produced at each evaporating face of the first stage, it is necessary to have a separate by-pass round the evaporator element of this first evaporating stage in the form of the duct noted, in which the preconcentrate has to rise against the head of liquid. This duct is prone to clog or foul. For the transfer of the preconcentrate to the second stage and the removal of the final concentrate, it is in each case necessary to have a pump, and the pipes joined therewith have to be thermally insulated.

In particular, trouble conditions are likely to crop up in the narrow spaces between one evaporator element and the next, that are placed in ascending succession in relation to the axis of turning. There is not only a formation of condensate in these narrow spaces, which may be readily run off to the outside by the action of centrifugal force, but furthermore gases are evolved on condensation, which gradually collect in the spaces and reduce thermal transfer to an ever increasing extent. Therefore it is necessary to have venting holes at the top or apex to let off such gases into the vapor space. Such a connection between the heating space and the vapor space, and for this reason with the evaporating faces, is undesired in the case of many feeds.

This is the reason that it is only possible to use heating fluids—primarily steam—which do not cause deterioration of the feed or concentrate chemically in respect of its odor or taste. Organic heating fluids may not be used at a high heating temperature. Because of the relatively low heating temperature of steam it is furthermore not possible for substances with a high molecular weight to be distilled. A further point is that evaporation may not take place under high vacuum, as otherwise the gases and the heating steam would be positively sucked into the evaporation space. The outcome of this would then be that a large number of thermally sensitive non-aqueous feeds, that are only able to be distilled under a high vacuum, would not be able to be handled in such an evaporator.

In a further known type of thin film evaporator (see U.S. Pat. No. 2,734,023), the rotor is composed of an array of adjacent toroidal evaporating elements, that are each in the form of a pair of shell-like metal plates turned towards each other. The vapors are drawn off at one open end of the rotor and passed at a boosted pressure by a compressor into the heating space. Such heating using the vapors, means for its part that there is a low upper limit for the heating temperature and the evaporation rate. This evaporator as well only operates in a single stage.

A further known design (see the U.S. Pat. No. 2,894,879) operating in several stages and also based on the thermocompression principle, had two conical and oppositely facing evaporating elements in each sealed-off stage. The feed was sprayed on the two facing faces of each stage, the concentrate was removed at the outside through a scoop tube and transferred by a pump into the next stage, something that was only possible with the use of a complex system of pipes inside and outside the evaporator. The use of vapor as a heat vehicle meant that this evaporator as well might only be run at a comparatively low temperature and with a small temperature differential between the heating space and the evaporating space.

SHORT OVERVIEW OF THE INVENTION

One aim of the present invention is to design a thin film evaporator of the sort noted at the outset that may be run under exacting conditions, that is to say with a high heating temperature and under a high vacuum.

A further object of the invention is to make possible such an evaporator that is simpler in its structure and construction, more specially as regards the amount of structural elements used and the amount of material needed for running the evaporator.

A still further object of the invention is to make possible a high rate of concentration in a small amount of space.

In order to attain these and further aims each pair of conical evaporating elements is mounted so that the elements taper away from each other to form a take-up trough for the concentrate and are fixed together at their outer edge, and to the outside are surrounded by a cylindrical heating space, the driving shaft of the rotor is level in the operative position of the evaporator and in each take-up trough in the vicinity of the top or apex of the rotor a scoop tube is mounted that runs transversely through the evaporating space downwards to the inner edge of the neighboring evaporator elements.

This arrangement of the conical evaporator elements, that has already been proposed in a thermocompression evaporator (see the U.S. Pat. No. 2,894,879), increases the utility of the evaporator as compared with the thin film evaporator taken as a starting point in the present invention (viz. as in the British Pat. No. 1,132,640) because each of the conical evaporator elements forms a face for the evaporation of the feed. Between each pair of outwardly diverging evaporator elements a ring-like section of the heating space is delimited, that has a relatively large cross section. It is useful and benefits the evaporator as a whole to mount the driving shaft of the rotor level, that is, in a horizontal position. By this arrangement, the gases that separate upon condensation of the superheated steam collect at the inner limit of the heating space because of their low specific gravity, and, may be removed from these large cross sections in a simple way. This makes possible a precisely controlled transfer of heat from the heating side of the evaporator elements. A particular point is that it is possible to dispense with venting holes leading into the vapor space so that it is possible to have a hermetic seal between the evaporating and vapor spaces on the one hand and the heating space on the other. This furthermore makes possible the use of any desired heating medium, more specially one with a higher boiling temperature as for example heat transfer fluids marketed by Bayer AG of West Germany under the trademark DIPHYL. These fluids are mixtures of diphenylether and ditolylether or dichlorobenzine and have boiling temperatures up to 400° C. so that there are no limitations with respect to the products to be handled either. Lastly, because of the placement of the scoop tubes, the feed may be kept in the evaporator till it reaches the final concentration stage, and it does not have to be conveyed from one stage to another by a pump: as a matter of fact, the scoop tubes remove the feed at the apex or top of each collecting trough and it is now possible for the feed to be transferred simply by its own kinetic energy, by which it is forced into the tube, and by gravity acting on it within the scoop tube, to the evaporating faces of the next evaporating stage. For this reason there is a rapid, closed-circuit movement of the feed within the evaporator with one supply pipe for the feed and a further output pipe for the final concentrate or product. The evaporating face or area may be matched to suit the rate of concentration in each evaporating stage, viz. the number of evaporator elements may decrease from one stage to the next. At the inlet of the scoop tubes there is not only a propulsion of the feed into the tube by its kinetic energy, but furthermore because of the resistance, the liquid feed is at the same time sprayed and flung in the form of droplets into the evaporating space and onto the next evaporating faces so that the efficiency is even further enhanced. Tests under working conditions have shown that despite its simple structure such an evaporator may be used to get a degree of concentration of for example about 1.7% in the feed to 85% in the final concentrate. For example of 100 liters of feed there would only be 2 liters concentrate left. Since many feeds contain solid particles, as for example metallic catalysts, crystals or the like, trouble conditions are likely each time the liquid is moved upwards inasfar as such particles are not carried along and may well clog the piping. This is put an end to by the continuously downward flow in the scoop tubes as noted.

In keeping with a preferred form of the invention, there is a overflow trough on the inner limit of each evaporator element for the supply of the feed to be concentrated, and a feed duct runs into the overflow trough of the evaporator elements of the first stage and the scoop tube (starting from the collection trough of the stage coming before) opens into the overflow trough of the second and each stage thereafter.

The design and placing of the overflow troughs at the inner limit means that a certain amount of feed has to collect in the overflow trough before it runs over the overflow edges of the evaporator element. This means that the feed runs evenly all round the inner limit of the evaporating face and in this way forms an even film all over the evaporating face. This at the same time results in an optimum utilization of the evaporating area so that for given performance figures the overall size and the structural complexity may be strictly limited.

It is preferred to mount one gas vent pipe at each of the innermost limits of the heating space, as for example at the inner limit of the evaporator element on the heating space side.

Whereas in the majority of the evaporating stages the feed of the two evaporating faces converging at the collection trough will collect in the last-named to be removed therefrom by the scoop tube, because of the greatly decreased rate of flow therein, it may be sufficient to have a single evaporator element in the last evaporating stages. Accordingly as part of a further useful development of the invention it is possible for the two last evaporating stages each to be constituted by merely one evaporator element and in the collection trough formed between them at the outer limit it is possible to have a partition with one scoop tube placed on each side, there being one such tube transferring the preconcentrate of the last-but-one stage into the overflow trough of the last stage from which the final product is removed by the other scoop tube and leaves the apparatus. That is to say, the collection trough is subdivided by the partition into two separate troughs collecting the feed from the evaporating surface running thereinto.

As part of a preferred form of the invention, the transfer or overflow trough between one evaporator element and the next is in the form of a ring of U-section with a middle web or wall whose outer edge, as seen in the circumferential direction, is further in than the overflow edges, nearest to each evaporating face, of the flanges of the U-section.

The ring of U-section functions on the one hand as a connection between one evaporator element and the next one to which it is joined at the inner face, and on the other hand as a means for the feed to be concentrated. Furthermore the U-sections make the rotor as a whole physically stronger.

Supply of the feed is by way of a distributing tube running into the rotor and which has at least two feed ports near one of each two evaporating faces converging towards each other in the first evaporating stage.

Furthermore, the scoop tube taking up the preconcentrate from one take-up trough of the first evaporating stage has at least two distribution tubes connected with it, of which each transfers the preconcentrate to one overflow trough of one of two adjacent evaporator elements of the next evaporating stage.

This design as well means that any desired size of the first and second evaporating stages may be joined thereto. If for example the first evaporating stage is composed of more than one converging evaporator element, it will be necessary to have a parallel number of scoop tubes that take up the preconcentrate from each overflow trough. Then the concentrated feed may be supplied by way of a single collection duct with a number of feed ports (or by way of a number of ducts each having a single feed port) to the second evaporating stage, the number of feed or input ports being equal to the number of evaporator elements in the second evaporating stage.

In the case of evaporators with conical evaporator elements, the size of the separate evaporating faces may be varied by designing with different cone angles. In the apparatus of the invention it is possible to have different cone angles in the different evaporating stages and/or different diameters so that the areas in each evaporating stage may be made to suit the specific needs.

DETAILED ACCOUNT OF WORKING EXAMPLE OF THE INVENTION

A single form of the invention will now be described that is to be seen in lengthways section in the FIGURE.

The thin film evaporator will be seen to have an enclosure 1 on whose one end a hydraulic drive motor 2 is mounted whose speed may be steplessly varied. The driving shaft 3 turned by the motor has a support flange 4 at its one end and the rotor, generally referenced 5, is attached thereto. The rotor is composed of a number of conical evaporator elements 6, 7, 8, 9, 10 and 11 that are spaced apart from each other, and a cylindrical casing 12 is placed around them so as to delimit or define a heating space between it and the outer limit of the evaporating elements 6 to 11. At their outer edges the evaporating elements are joined with the casing 12 by way of bars 41. The heating fluid or heat vehicle, as for example steam, is supplied via a pipe connector 13 to the end of the enclosure 1 that is opposite to the end with the hydraulic drive motor 2 and makes its way into the heating space, it flowing round the outer side of the evaporating elements 6 to 11 as marked by the arrows. The condensate produced in this respect is driven outwards because of the centrifugal force and is taken up at the inner face of the casing or enclosure 12 by a scoop tube 14 so that it may be pumped 15' by a condensate pump along a pipe 15. Furthermore there are additional venting tubes 16, of which each is situated in the space between one evaporating element and the next such as elements 7 and 8, 8 and 9 and 9 and 10 to make it possible to let off gas that collects here. These vent tubes 16 are joined up with the condensate pump by way of a collecting duct 17, such pump in fact removing condensate and evolved gases.

The evaporating elements 6 to 11 are eachjoined to transfer or overflow troughs at their inner edges, the overflow troughs 18 at the two ends of the evaporating space being in the form of simple rings of U-section material, whereas the other overflow troughs 19 are each made up of a ring of U-section material with a middle wall or web 20. The inner edge of the wall web 20, as may be seen from the figure, has a smaller inner diameter than the respective outer overflow edges 21 and 22 of the flanges of the inwardly projecting U-section material.

The feed is supplied by a pump 23 and a pipe 24 into the rotor 5. To this end the pipe 24 runs into the free interior space of the rotor and in the present working example comes to an end at two ports 25 and 26, the supply port 26 being for the supply to the trough 18 and the feed port 25 being for supplying the first overflow trough 19 with the transfer or overflow edge 21. In this form of the invention the evaporating elements 6 and 7 therefore form a first evaporating stage I, in which the feed is concentrated.

The externally united evaporating elements 6 and 7 on the one hand and 8 and 9 on the other each form a take-up trough 27, 28 and 29. There is a scoop tube 30 projecting into the take-up trough 27 of the first evaporating stage I in the vicinity of the highest point or apex thereof to take up the concentrated product and to supply it by way of distribution pipes 31 and 31' with two discharge ports (not shown) into the overflow troughs of the evaporating faces of the evaporating elements 8 and 9 of the second stage II. Once concentrated, the feed then moves over the overflow edges 22 and 21 of these two troughs, spreads out again in the form of a film on the evaporating faces of the evaporating elements 8 and 9 and by the time it gets to the take-up trough 28 it will have a higher concentration. This take-up trough is as well furnished with a scoop tube 32 that transfers the feed after such further concentration into the part, placed to the right of the wall web 20, of the overflow trough 19 of the evaporating element 10 that forms the third evaporating stage III. After the third concentration operation the feed is collected in the collection trough 29 that is subdivided by a partition 33 into a left and a right part. In the left part there is again a scoop tube 34 to scoop up the concentrate and to pass it into the overflow trough 18 of the last evaporating stage IV, whence it spreads out over the face of the evaporating element 11 and lastly gets to the right part of the collection trough 29 as the final concentrate. By way of a scoop tube 35 placed here and a pump 36 the concentrate is pumped out of the evaporator. The space within the rotor 5 is connected with the space in the enclosure 1 so that vapors produced during the process of concentration may be run off as marked by the arrows through a connector 37.

It is only for the sake of completeness that it is to be noted that the enclosure 1 has inspection windows 38 and 39 for viewing the sensitive parts of the evaporator. Furthermore the rotor 5 is supported by a plain bearing 40 on the enclosure at the end opposite to the end with the hydraulic drive motor 2. At the end of the enclosure 1 that is to the right in the figure there are vanes 42 mounted on the driving hub, such vanes running out as far as positions near the rotor 5 and retarding the swirling vapors. These vanes 42 function to separate droplets entrained by the vapors or produced by condensation. As will be seen from the figure, the complete rotor with its heating and evaporating space may be fabricated by welding so that it does not have any openings or joints and for this reason does not need any seals or gaskets.

The size of evaporating faces of the separate evaporating elements 6 to 11 may be varied by the designer to be in line with actual needs by changing their diameter and/or their cone angle. In particular, it is possible for the different evaporating stages I, II, III and IV to have different diameters and/or cone angles in them, the evaporation rate and the residence time being changed in each stage in a way dependent on such design features. It is furthermore possible for the speed of travel of the film on the separate evaporating elements to be affected by having an interrupted face, viz. with a number of humps or bends therein. Such an evaporating element is furthermore stronger.

I claim:

1. In a thin-film evaporator having: an enclosure defining a vapor space, a central driving shaft projecting into the enclosure, a rotor attached to the driving shaft within said enclosure, said rotor being formed with axially spaced conical evaporator elements coaxial to said driving shaft and defining an evaporation space that is connected with the vapor space, at least some of the axially adjacent conical evaporator elements forming the rotor being mounted in pairs so that the conical elements thereof taper away from each other toward opposite axial ends of the rotor and have the bases of the conical elements joined at their outer edges with adjacent elements and partitions to form take-up troughs, the conical elements being surrounded externally by a cylindrical heating space separated from the vapor space, scoop tubes leading from the take-up troughs of evaporating stages formed by some of the conical elements to subsequent evaporating stages for discharge as a final concentrate at one end of the rotor, and means for supplying a feed to the opposite end of the rotor at the inner edge of at least one conical evaporator element of a first evaporating stage to spread the feed outwards as a film and to reach a take-up trough at the outer edge of said element as a preconcentrate to be taken up by way of one of the scoop tubes, the improvement wherein:

said rotor mounted on the central driving shaft has an axis of rotation disposed horizontally when the evaporator is in an operative position; and an intake end of at least one of the scoop tubes is mounted in a take-up trough in the vicinity of the top or apex of the rotor in the operative position of the evaporator, and each tube with the intake so mounted extends transversely through the evaporating space and downwardly to the inner edge of a neighboring evaporator element to convey the preconcentrate between evaporating stages by gravity without the use of an external pump.

2. The thin film evaporator as claimed in claim 1 further comprising an overflow trough at the inner edge of each evaporator element for the supply of the feed to be concentrated, and wherein one of the scoop tubes runs from the take-up trough of the first evaporating stage to the overflow trough of a subsequent evaporating stage.

3. The thin film evaporator as claimed in claim 1 comprising a gas vent tube communicating with the innermost limits of the heating space.

4. The thin film evaporator as claimed in claim 1 wherein the number of evaporator elements per stage decreases from the first to the last evaporating stage.

5. The thin film evaporator as claimed in claim 2 wherein each of the last two evaporating stages consists of one conical evaporator element and a common partition, a take-up trough is formed at each side of the partition at the outer limit of the evaporator with one of said scoop tubes placed on each side of the partition, one of said tubes being placed to transfer the preconcentrate of the last-but-one stage into the overflow trough of the last stage.

6. The thin film evaporator as claimed in claim 1 wherein an overflow trough is formed between one pair of evaporator elements, and is a ring of U-seciton with inwardly projecting end flanges and an intermediate inwardly projecting middle web or wall whose inner circumference is smaller than the inner circumference of the end flanges.

7. The thin film evaporator as claimed in claim 1 wherein two of the adjacent evaporator elements form the first evaporating stage of the evaporator, and the means for supplying a feed comprises a distributing tube running into the rotor and having at least two feed ports discharging respectively onto the evaporator elements of the pair forming the first evaporating stage of the evaporator.

8. The thin film evaporator as claimed in claim 1 wherein the scoop tube for taking up the preconcentrate from one take-up trough of the first evaporating stage has at least two distribution tubes connected with it, of which each is routed to transfer the preconcentrate to an overflow trough formed between two converging adjacent evaporator elements of the next succeeding evaporating stages.

9. The thin film evaporator as claimed in claim 1 comprising vent tubes and a condensate tube mounted on an enclosure of the heating space and leading to a pump joined in common with said tubes externally of the evaporator.

10. The thin film evaporator as claimed in claim 1 wherein said rotor is fabricated substantially as a gasketless welded structure.

11. The thin film evaporator as claimed in claim 1 comprising radial stationary vanes mounted at an end of said enclosure adjacent said evaporating space of said rotor, said vanes running to an end face of said rotor.

* * * * *